United States Patent [19]

Kurogane et al.

[11] Patent Number: 5,126,858
[45] Date of Patent: Jun. 30, 1992

[54] PICTURE IMAGE PROCESSING SYSTEM

[75] Inventors: Toshio Kurogane; Yuji Hikawa, both of Kanagawa, Japan

[73] Assignee: Fuji Xerox Co., Ltd., Tokyo, Japan

[21] Appl. No.: 595,218

[22] Filed: Oct. 10, 1990

[51] Int. Cl.$^5$ .................................. H04N 1/387
[52] U.S. Cl. .................................. 358/450; 358/453; 358/451; 355/202
[58] Field of Search .............. 358/400, 401, 450, 451, 358/452, 453, 448, 468; 355/200, 202, 244

[56] References Cited

U.S. PATENT DOCUMENTS

| | | | |
|---|---|---|---|
| 4,270,146 | 5/1981 | Adachi | 358/450 |
| 4,352,012 | 9/1982 | Verderber et al. | 358/403 |
| 4,757,348 | 7/1988 | Rourke et al. | 358/300 |
| 5,051,779 | 9/1991 | Hikawa | 355/200 |

FOREIGN PATENT DOCUMENTS

57-173262  10/1982  Japan .................. 358/450

Primary Examiner—Edward L. Coles, Sr.
Assistant Examiner—Thomas D. Lee
Attorney, Agent, or Firm—Finnegan, Henderson, Farabow, Garrett and Dunner

[57] ABSTRACT

A picture image processing system which produces output picture images by executing picture image processing operations on input picture images with an input means furnishing instructions on machine operations, input picture information from an original document, and processed picture information for the input picture information, a recognizing means for the information mentioned above, a composite picture image generating means producing composite picture images by integration of the processed picture information into the input picture information recognized as mentioned above, and an output means yielding the output of such composite picture images on paper. The picture image processing system of the present invention is capable of performing a variety of picture image editing and composing functions and a variety of functions for producing an output of composite picture images using different types of picture image output equipment and sending the output to multiple destinations for document distribution.

15 Claims, 12 Drawing Sheets

PICTURE IMAGE PROCESSING SYSTEM

BACKGROUND OF THE INVENTION

1. Field of the Invention

The present invention relates to a picture image processing system which performs processing operations on images in a particular format on the basis of the information obtained from a recognition gained of such images.

2. Discussion of the Related Art

There are copying machines and facsimile machines which are known in the art that have functions such as specifying a composing frame or a destination for electrical transmission using standard formats which have been registered in the equipment in advance with reference to a face sheet which indicates such standard formats which have been attached to the cover of an original document.

Picture image processing equipment which produced output picture information by processing input picture information by using a means generally called a "paper user interface", i.e., a job control sheet which describes a set of definitions of information on operating instructions for the machine, is disclosed in U.S. Pat. No. 4,757,348.

However, conventional equipment is not capable of providing any paper output having a description of the processing operations which were specified on the original document. This description should preferably include concurrent instructions for a composing frame and a destination for the electrical transmission, instructions for the insertion and integration of a message in a composite picture, instructions for pagination, and instructions for a distribution list. Moreover, conventional equipment which has been provided with a single function which permits the setting of a composing frame or a destination for electrical transmission requires that a selection should be made from those items which have been registered with the machine in advance. This does not allow the setup to be easily altered. This presents a problem in that the user has a limited ability to freely choose such items.

SUMMARY OF THE INVENTION

The present invention has been made in view of the above circumstances and has as an object a picture image processing system capable of processing picture images and allowing the system operator to exercise a high degree of freedom in the execution of processing operations as expressed in the output picture images.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

In order to achieve the objects set forth hereinabove and in accordance with the purpose of the invention as embodied and broadly described herein, the picture image processing system according to the present invention, which produces output picture images by performing picture image processing operations on the input picture images, comprises: an information input means furnishing the input of information for instructions on machine operations, picture information read from an original document, and picture-processing information relevant to the input picture information; a means of recognizing the information mentioned above; a means of producing composite picture images by processing the recognized input picture image information with the processed picture information applied thereto; and a means of printing the output of the resulting composite picture images on paper.

The aforementioned information input means is a job control sheet which is provided with a machine operation instruction block and a process instruction block. The machine operation instruction block contains a set of definitions of information for instructions on the machine operations. The process instruction block sets the definitions for the processed picture information which determines how the input picture information is to be processed.

The information input means may also be an input device other than a job control sheet.

The means for producing composite picture images is capable of moving such composite picture images, or of rendering the picture images at variable magnifications, or of performing both of these functions.

The means of producing composite picture images also has the function of producing composite picture images by inserting the processed picture information into the input picture information or the function of producing composite picture images by adding the picture processing information to the input picture information.

Another job control sheet in accordance with the present invention is composed of a machine operation instruction block which defines different information for instructions concerning the machine operations for every single page or for a plurality of pages for input picture information in a plurality of pages and a process-instruction block which defines the processed picture information in correspondence to the instructions of on the machine operations.

Still another job control sheet is provided with a machine operation instruction block which contains information for instructions on machine operations for a plurality of machines and a process-instruction block in which processing information is written for the information on instructions for the operations of a plurality of machines as just mentioned, and an optional instruction block by which the user can choose any desired instructional information out of the information mentioned above, and thus this job control sheet is composed in such a manner that it can compose the processed picture information for the input picture information on the basis of the information selected as described above.

A picture image processing system according to another embodiment as described herein is provided with; a means of furnishing the input of information for instructions on machine operations, input picture information obtained from the original document, and the processed picture information for the input picture information; a means of recognizing the information just mentioned, a means of accumulating composite picture images, and a means of outputting such composite picture images by printing them on paper.

The picture image processing system according to the present invention receives an input of information for instructions on machine operations, input picture information obtained from an original document, and processed picture information for the input picture information just mentioned and produces composite picture images formed by processing the input picture images in accordance with the instructions on machine operations as recognized on the basis of these types of input information.

If the aforementioned information is to be inputted by the job control sheet, the machine operation instruction block defines a facsimile job, for example, as instructions for the operations to be performed by the machine. A message, for example, is then sent to the process-instruction block as the processed picture information to be printed (i.e. output) on the output paper for the defined job. The output paper produced by this job represents the processed picture information inserted into or added to the picture information from the original document in its original size or on an enlarged scale to form composite picture images in accordance with the layout registered in advance in the picture image processing system.

BRIEF DESCRIPTION OF THE DRAWINGS

The accompanying drawings, which are incorporated in and constitute a part of this specification illustrate embodiments of the present invention and, together with the description, serve to explain the objects, advantages and principles of the invention. In the drawings.

DESCRIPTION OF THE PREFERRED EMBODIMENTS

A detailed description is now provided for several examples of preferred embodiments of the present invention. Reference is made to the accompanying drawings.

Figure 1:
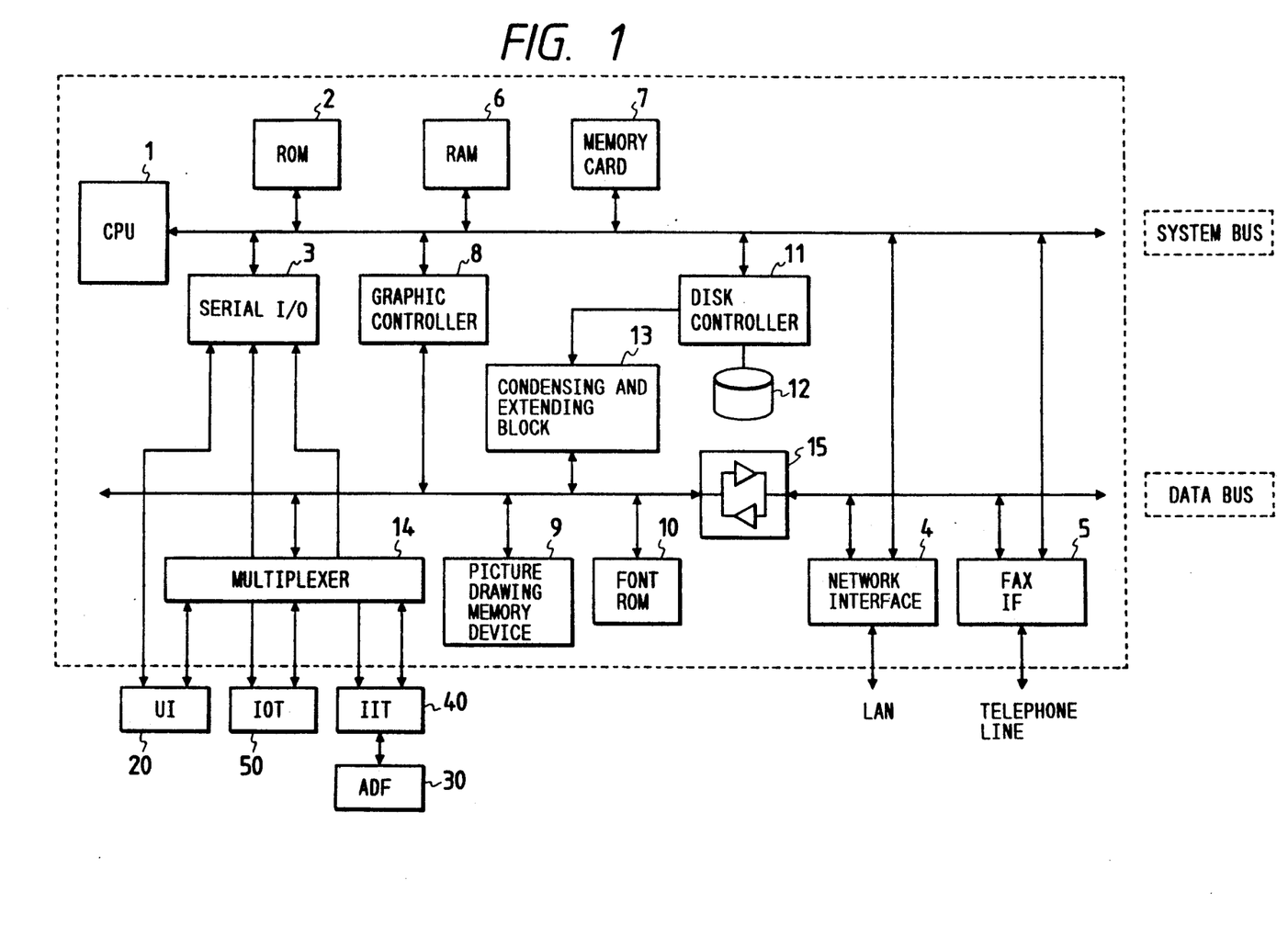
FIG. 1 illustrates the control block for a picture image processing system using a paper user interface.

FIG. 1 illustrates the control block for a picture image processing system using a paper user interface. The central processing unit (CPU) 1 executes the control programs stored in a read only memory device (ROM) 2 and generates output picture information by processing picture images on the basis of input picture information received from various types of input equipment. The CPU 1 thereafter outputs the resulting output picture information through the recording block (Image Output Terminal: IOT) 50 of this system, or sends it to other picture image processing equipment via a network line LAN (Local Area Network) 54, or sends it to a facsimile machine via a telephone line 53. The input picture information is composed of the information for instructions on machine operations as defined by the job control sheet and the picture image information obtained from the original document. The output picture information contains the modified output picture image information from the job control sheet in addition to the output picture image information obtained from the original sheet. The input equipment comprises various user interfaces (UI) 20 such as a control panel, a keyboard, and a mouse for this picture image processing system, a picture image reading block (Image Input Terminal: IIT) 40, which reads a stack of original documents (hereinafter called "a batch"), as well as a job control sheet, set in the automatic document feeder (ADF) 30, and the other picture image processing equipments (not illustrated in the Figure) which are connected to this system via a network line, a telephone line, or the like.

The input picture information fed from a job control sheet is sent to the CPU 1 via a serial I/O 3 and interfaces (IF) 4 and 5, and the CPU 1 thereby recognizes the information indicated by sheet detecting marks on such items as the direction in which the original document is set and the job attributes such as the size and number of sheets of paper, the destination of the processed document, and the determinate information on the attributes of the job are stored, together with the identification (ID) information for the job, in a backup RAM 6 or on a memory card 7. A graphic controller 8 is started up at the same time, and, executing a formal generating task stored in the ROM 2, the graphic controller 8 draws picture images on a picture drawing memory device 9 on the basis of the input picture information sent to the data bus 52 through a multiplexer 14 or the input picture information sent to the data bus 52 through network interface 4 and facsimile interface 5 and a gate 15, and also generates the image pattern indicated on the job control sheet, reading into itself the characters from a font ROM 10. The functions of the abovementioned graphic controller 8 work in the same manner on the input picture information obtained from an original document, and the image pattern representing the original document is generated on the picture drawing memory device 9.

A generated image pattern is stored in the form of picture image data on a hard disk 12 as required. A disk controller 11 processes in a condensing and extending block 13, condensing the picture image data generated in this system as well as the picture image data which come transmitted from another picture image processing equipment, and also extends the picture image data accumulated in the condensing and extending block 13 and feeds the extended picture image data to the data bus 52.

Figure 2:
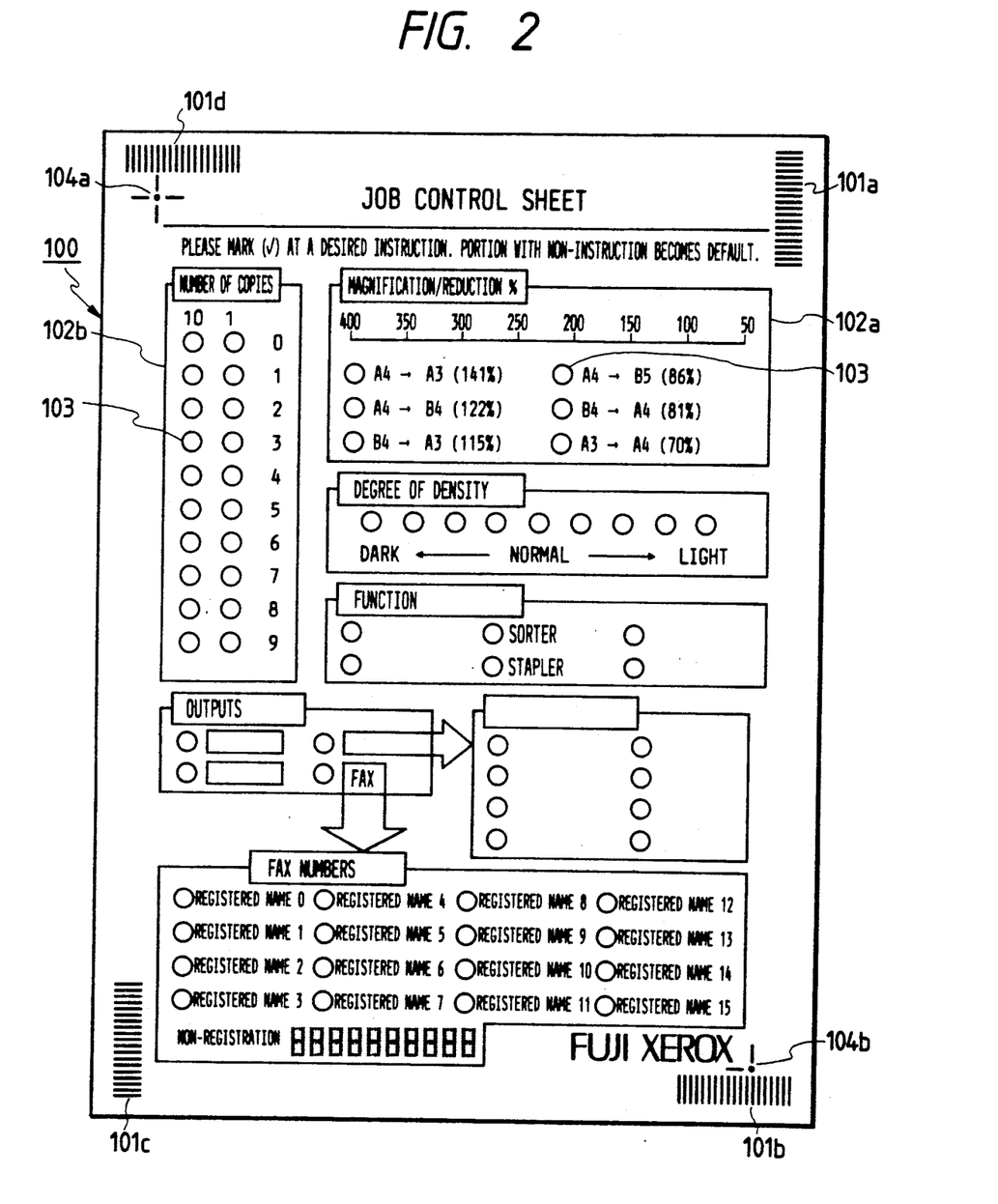
FIG. 2 illustrates an example of the job control sheet.

A description of the job control sheet is provided below. FIG. 2 illustrates the format of a job control sheet is provided below.

The job control sheet 100 has sheet detecting marks 101 (a to d) arranged in its four corners and in points in their symmetrical relationship representing different attributes of the sheet, as illustrated in FIG. 2, and a job control instruction block 102 (a, b, . . . ) with entry columns for checking the attributes of a job provided on the inner side of these marks.

Because of the arrangement of the sheet detecting marks 101 in the four corners of the sheet, it is possible to identify the attributes of the sheet immediately after the start of a scanning operation. Because the marks are arranged symmetrically, it is also possible to read the sheet in any direction. That is, the individual marks have an attribute with different information indicating the scanning direction, such as the vertical forward direction, the vertical reverse direction, the horizontal forward direction, and the horizontal reverse direction. Also, the job control instruction block 102 is provided with originating points 104a and 104b for the picture image coordinates which are necessary to recognize the sheet. The originating points provided in this manner make it possible for the system to function properly even if the job control sheet is skewed.

The functions of the job control sheet are described below.

Figure 3:
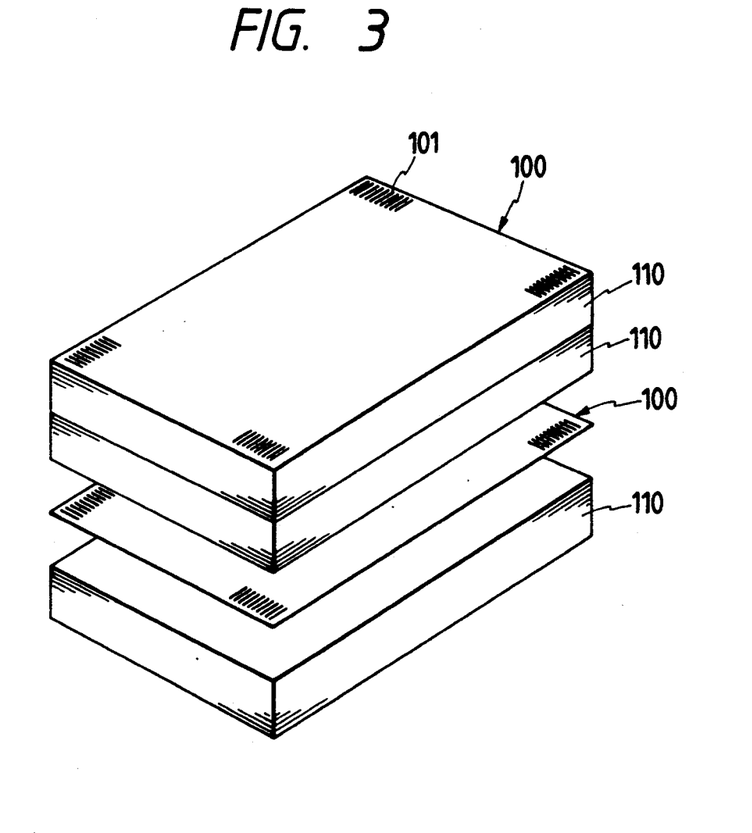
FIG. 3 illustrates batch processing.

The user checks the required jobs, indicating the items by deleting or entering an X-mark, for example, in the check columns 103 on the job control sheet 100. The user then places this job control sheet over the original document 110, as shown in FIG. 3. With this batch of original documents stacked in the automatic document feeder (ADF), the original document batch is transported to the picture image reading block (the Image Input Terminal: IIT) based on the instructions given on the job control sheet. The picture image reading block (IIT) converts the picture images on the original document or those on the job control sheet into electrical signals, namely, input picture information. The information thus obtained is stored, through the multiplexer, in the picture drawing memory device 9. The CPU 1 then identifies the sheet detecting marks in the input picture information. If the CPU 1 finds that the picture images currently being scanned are those of the job control sheet, the operation for recognizing the requirements of the job indicated on the job control sheet is performed. In this regard, the operation for recognizing the requirements of the job is not performed when processing any original document other than a job control sheet. Next, the CPU 1 searches the originating points for the picture image coordinates on the basis of the attributes identified with reference to the sheet detecting marks. It starts the recognition of the requirements of the job on the basis of the originating points and the numbers. The hard disk contains look-up tables (LUT) which are capable of recognizing the requirements of the individual jobs with reference to their numbers. These tables are provided in advance and they correspond to the types of the job control sheets. These look-up tables (LUT) define what jobs are to be performed on the images on the job control sheet itself and on the coordinates in the user check column. Therefore, the operation for the recognition of the requirements of a job first finds the relative coordinates from the originating points for the picture image coordinates to the points marked by the user's checks and then identifies the job through a search of the appropriate LUT on the basis of those relative coordinates. Thereafter, the determinate job is executed on the original document which follows the job control sheet. For example, if a determinate job is to be output from the system itself, the picture image data of the original document is read out of the picture drawing memory device 9 and sent as an output to the recording block. If the picture image data is to be sent via a facsimile machine or to be processed at a work station in another system, the output picture information is transmitted by using the respective interfaces.

Another preferred embodiment of the job control sheet is described below.

The job control sheet is provided with a machine operation instruction block and a process instruction block. Information for instructions on machine operations, such as instructions on telephone numbers and the processing of messages is written on the machine operation instruction block. Messages to the individual destinations or to all the destinations are written on the process instruction block.

Various types of job control sheets can be described as follows. In this respect, it is to be noted that the job control sheet which is provided with a process-instruction block can be used either alone or in combination with another job control sheet, such as the job control sheet shown in FIG. 2. For the job control sheets in the present examples only the functions of a job control sheet provided with a process-instruction block will be described.

Figure 4:
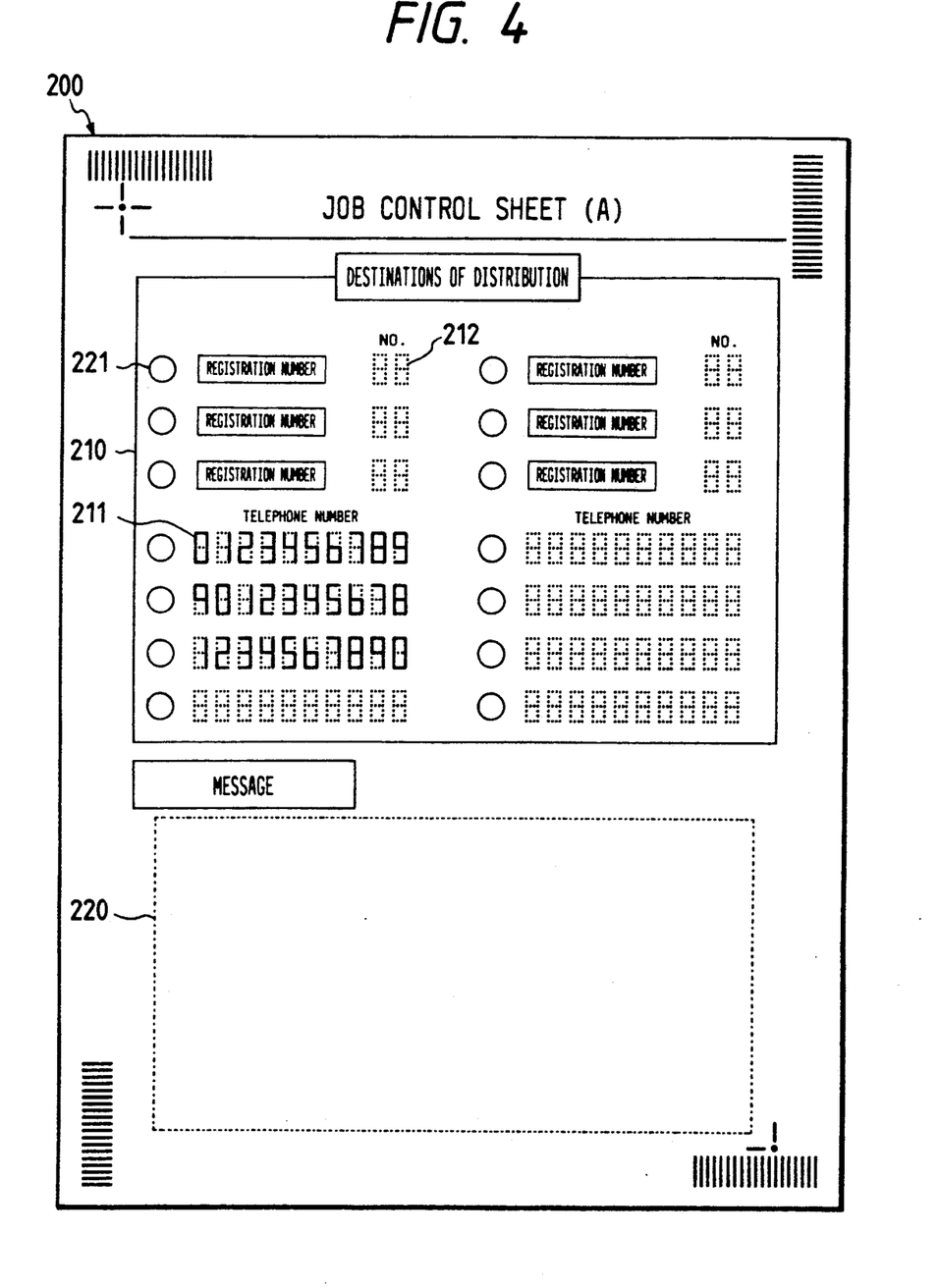
FIG. 4 illustrates an example of the job control sheet (A)
Figure 5:
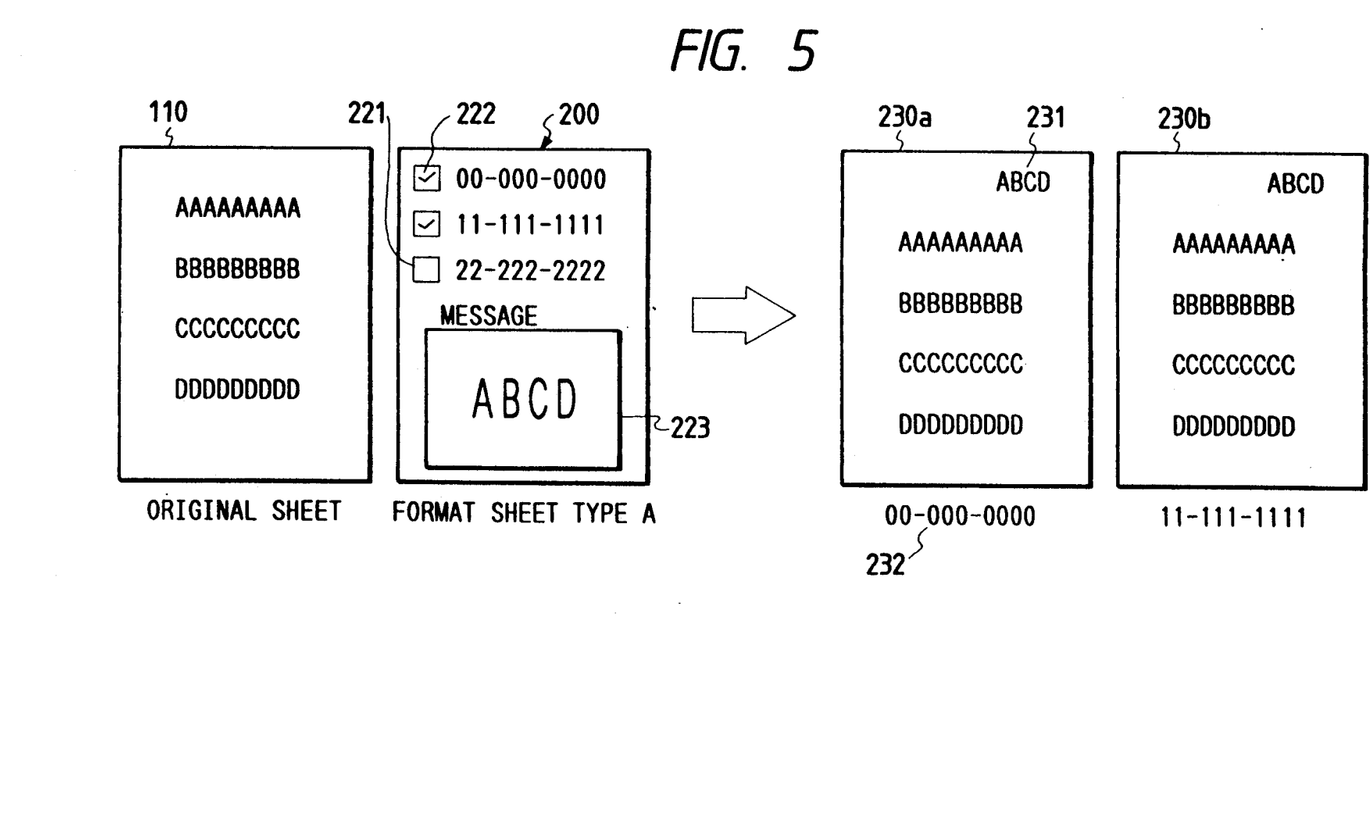
FIG. 5 illustrates an example of output paper with composite picture images formed thereon by insertion by the use of the job control sheet (A)

As illustrated in FIG. 4, the machine operation instruction block 210 on the job control sheet (A) 200 contains telephone numbers 211 and their abbreviated numbers 212 written on it for facsimile transmission of output picture image information. The process-instruction block contains a common message to be printed (i.e. output) on the output paper to all the defined distribution destinations written on it. FIG. 5 illustrates one example of output paper printed by job control sheet (A). In this example, a check 222 is entered at two locations in check column 221 in the machine operation instruction block to indicate the destinations for the distribution of the job output. The contents "A, B, C, and D" are written in message column 223 in the message area. When this job control sheet 200 is used as a cover for the original document 110 and both of these are placed in the automatic document feeder (ADF), the message contents are inserted either in their original size or a reduced size into the original document to form their composite picture images. Output paper sheets 230a and 230b, with message 231 inserted in an upper right area of each paper sheet, are produced as output from facsimile machines at the respective destinations of distribution.

In this case, the layouts for the output paper are registered in advance with the picture image processing system and controlled by their control numbers. Thus, when the user desires to have the above-mentioned batch processing operation executed, he inputs the proper control number on the user interface, and the system executes the job. This operation can also be performed with the job control sheets described below.

Figure 6:
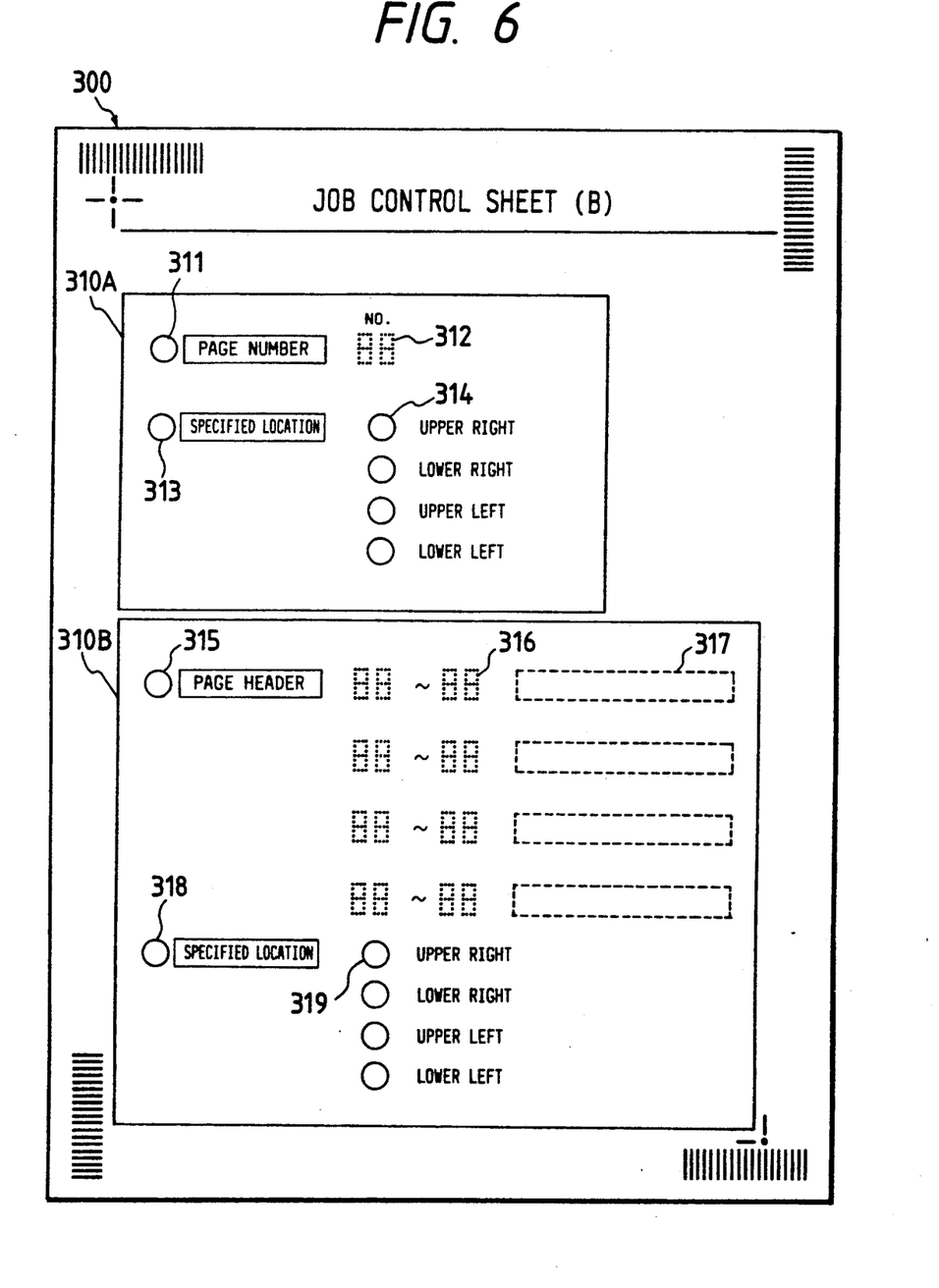
FIG. 6 illustrates an example of the job control sheet (B)

As shown in FIG. 6, the machine operation instruction block on job control sheet (B) 300 comprises a page number instruction section 310A and a page header instruction section 310B. The instructions for printing the page numbers are given by specifying the printing of the page numbers with a mark entered in check column 311, specifying the page number for the first page in page entry column 312, specifying the numbering of pages with a mark entered in check column 313, and specifying in check column 314 the position on the paper where the page number is to be printed. The instructions for page heading are provided as follows. The page heading job is specified in check column 315. The pages to be given headers are written in page entry column 316. The header is entered in header column 317. The heading job is specified by a mark entered in check column 318. The position on the paper where the header is to be printed is specified in the check column 319.

Figure 7:
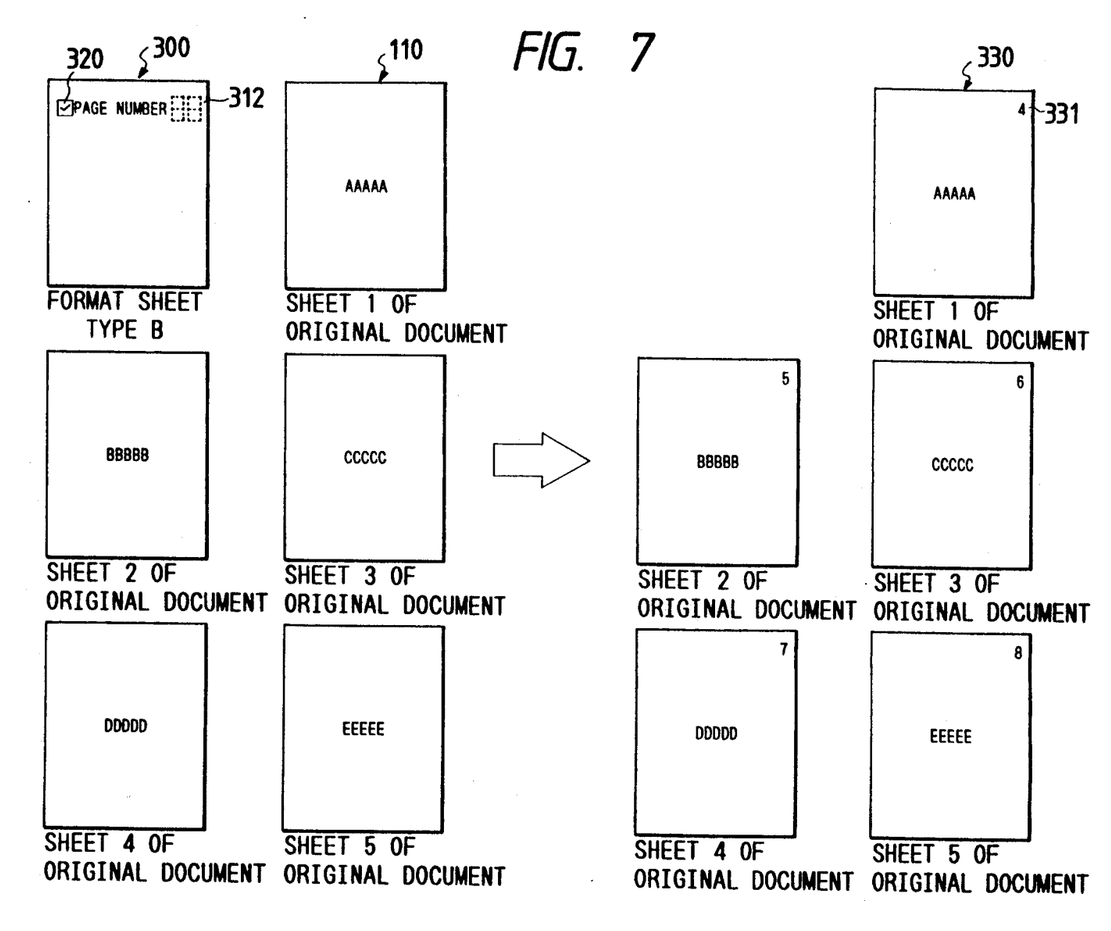
FIG. 7 illustrates an example of output paper produced by the addition of the page number with the job control sheet (B)

FIG. 7 illustrates an example of output paper produced by adding a page number with job control sheet (B). In this regard, it is assumed that the instructions for the position of page numbering are specified as the upper right area of the output paper. In this example, the page numbering job is specified by a check 320 in check column 311 in the machine operation instruction block on the job control sheet, and the page number "4" to be printed on the starting page for pagination is entered in page entry column 312. This job control sheet 200 is placed as a cover on the original document (sheets 1 through 5) 110. These sheets are taken together and fed into the equipment for processing the picture images on them. The output paper 330 is produced as output with page numbers 331 printed thereon. Page number "4" is printed on the sheet corresponding with the first sheet of the original document; page number "5" printed on the sheet which corresponds with the second sheet of the original document, and so forth.

Figure 8:
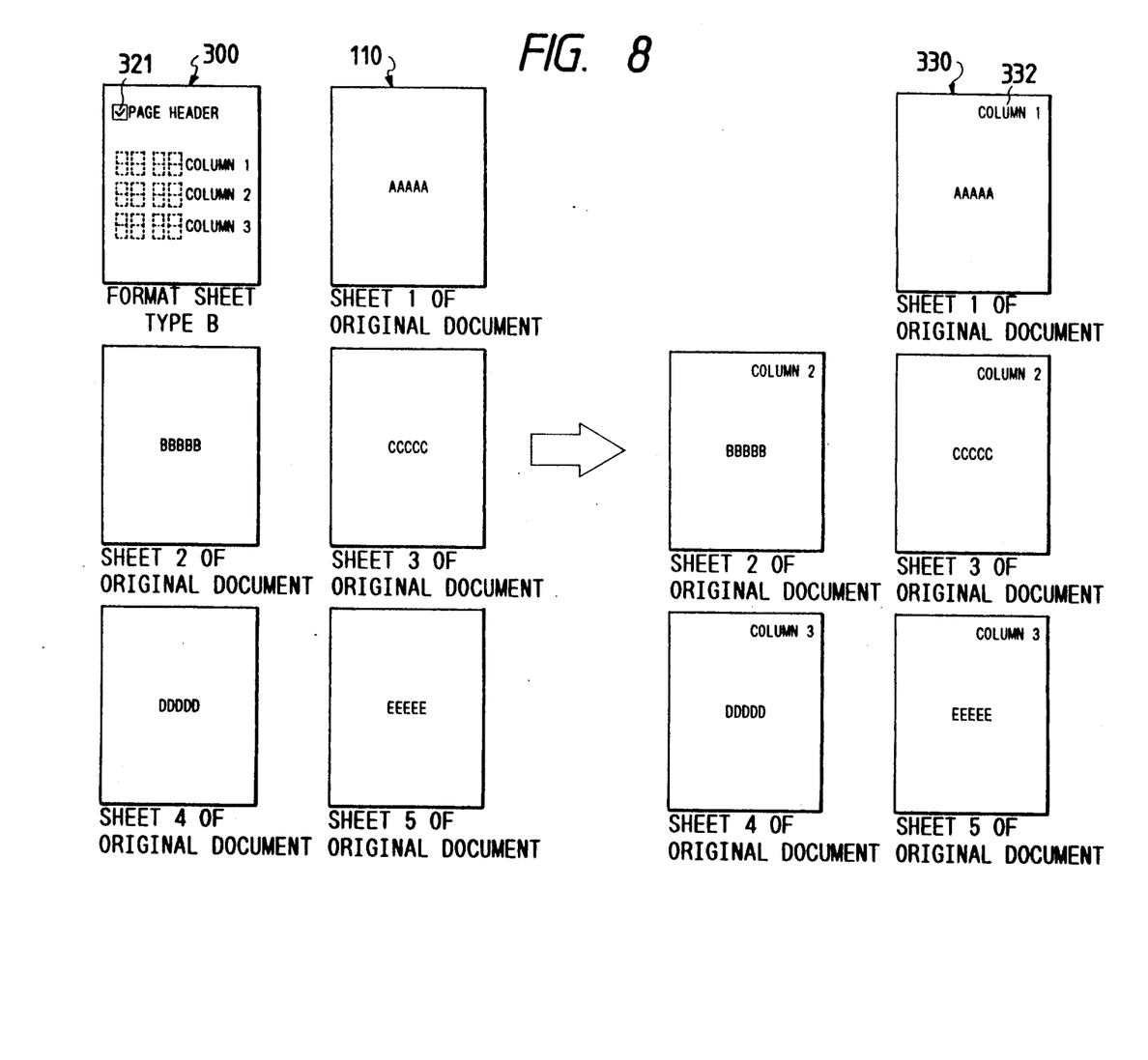
FIG. 8 illustrates an example of output paper produced by the addition of a header with the job control sheet (B)

FIG. 8 illustrates an example of output paper produced by adding a header with job control sheet (B). In this example, the heading job is specified by a check 321 in the check column 315 in the machine operation instruction block on the job control sheet. The page entry column 316 has nothing entered in it because only one page is to be given a header. Then, the headers "Chapter 1", "Chapter 2", and "Chapter 3" are entered in the header columns 317. With this job control sheet 300 used as the cover of the original document (1-5) 110, the picture images on them are processed.

On the output paper 330, the headers 332 are printed in the order of "Chapter 1" in correspondence to the first sheet, "Chapter 2" corresponding to the second sheet, and "Chapter 3" corresponding to the third sheet, respectively, of the original document 110.

Figure 9:
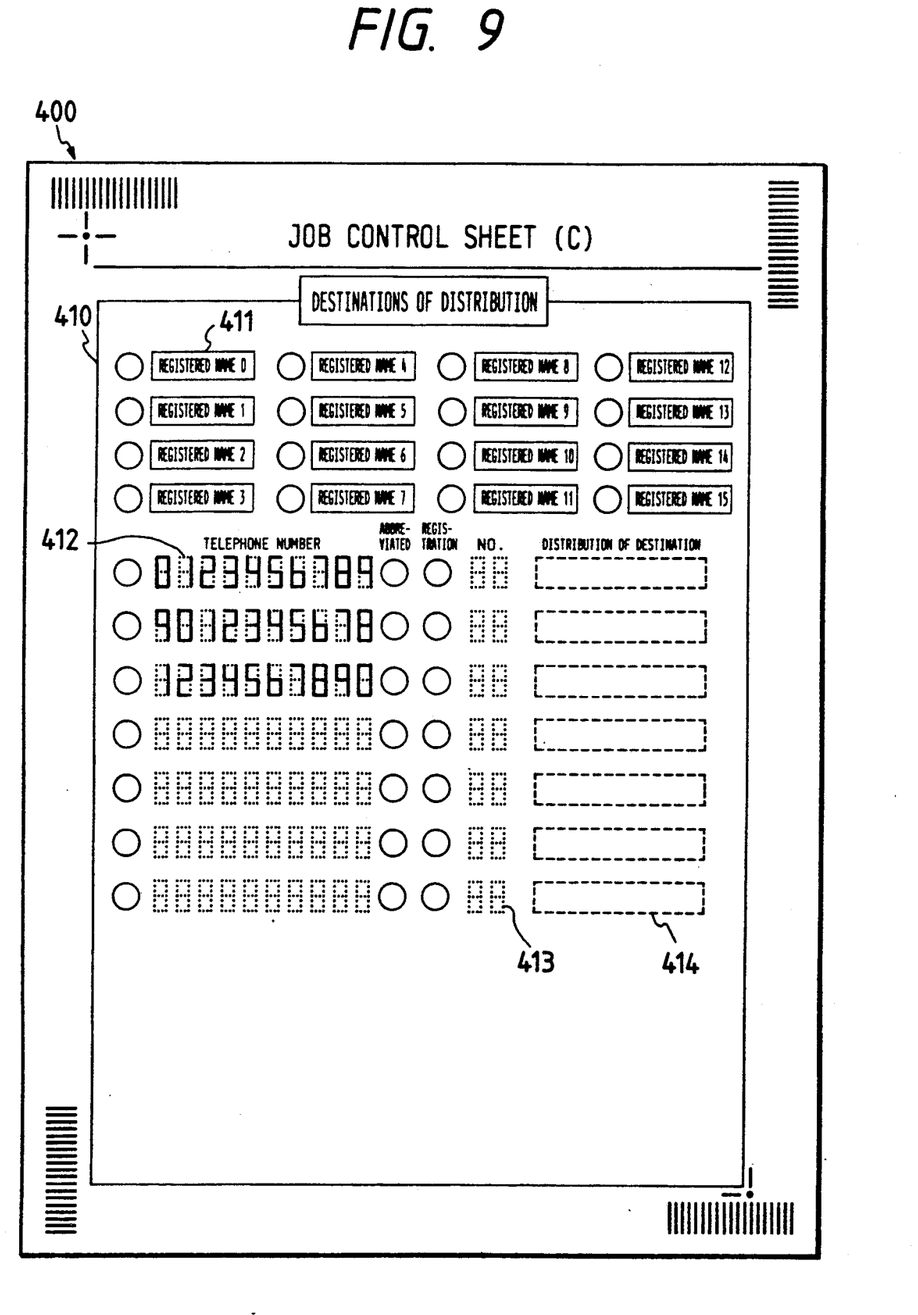
FIG. 9 illustrates an example of the job control sheet (C)

As shown in FIG. 9, job control sheet (C) 400 is provided with a machine operation instruction block 410, in which the destinations for distribution by facsimile are registered in advance. Specifically, the machine operation instruction block 410 is provided with a column 411 containing the registered names corresponding to the registration numbers, with a column 412 for the entry of the telephone numbers, a column 413 for the entry of the abbreviated numbers for registering the entered telephone numbers, and a column 414 for the entry of the destinations for distribution.

Figure 10:
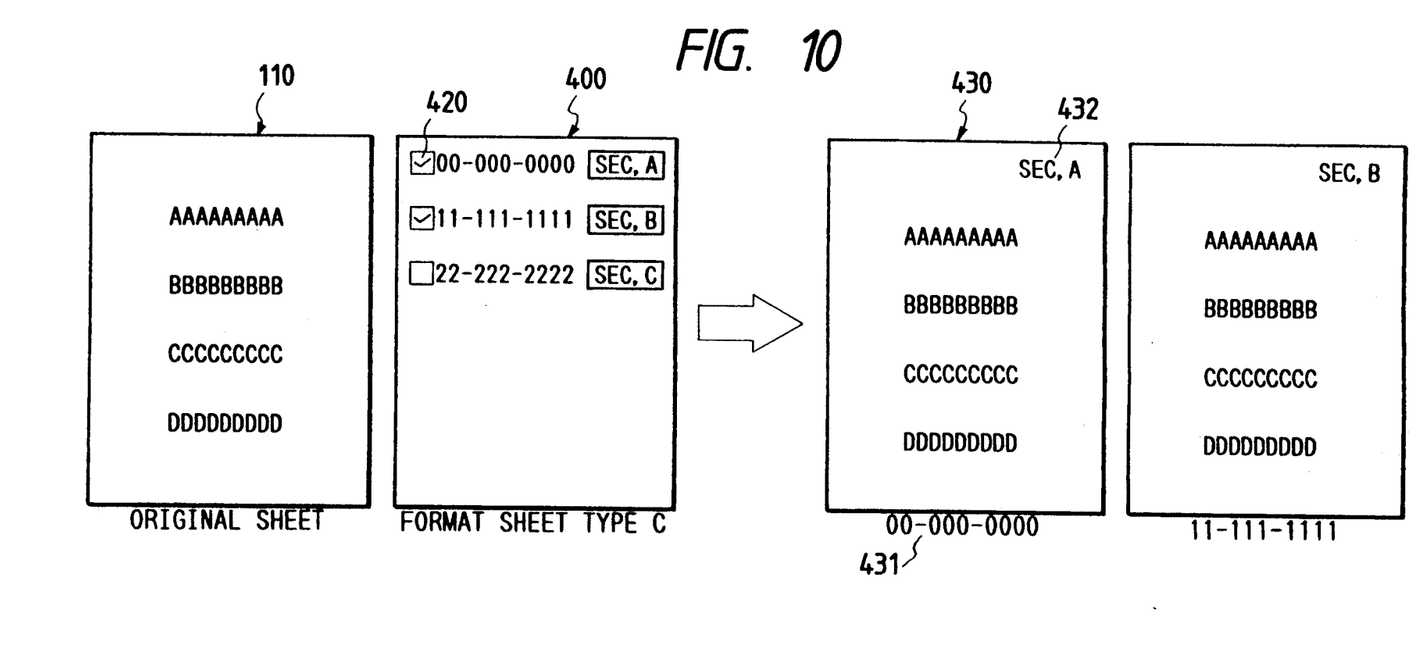
FIG. 10 illustrates an example of output paper with an address printed on a correspondence document by using the job control sheet (C)

FIG. 10 illustrates an example of output paper with an address printed on a corresponding document by using job control sheet (C). In this example, a check 420 is entered in two locations to identify the destinations for distribution among the telephone numbers entered in the telephone number entry column 412 in the machine operation instruction block on the job control sheet. Thus "Destination A" and "Destination B" are specified here as the destinations of distribution. With this job control sheet 400 used as the cover of the original document 110, the picture image processing operations are performed thereon.

The destination name 431 is printed for each distribution destination 431 on output paper 430.

Figure 11:
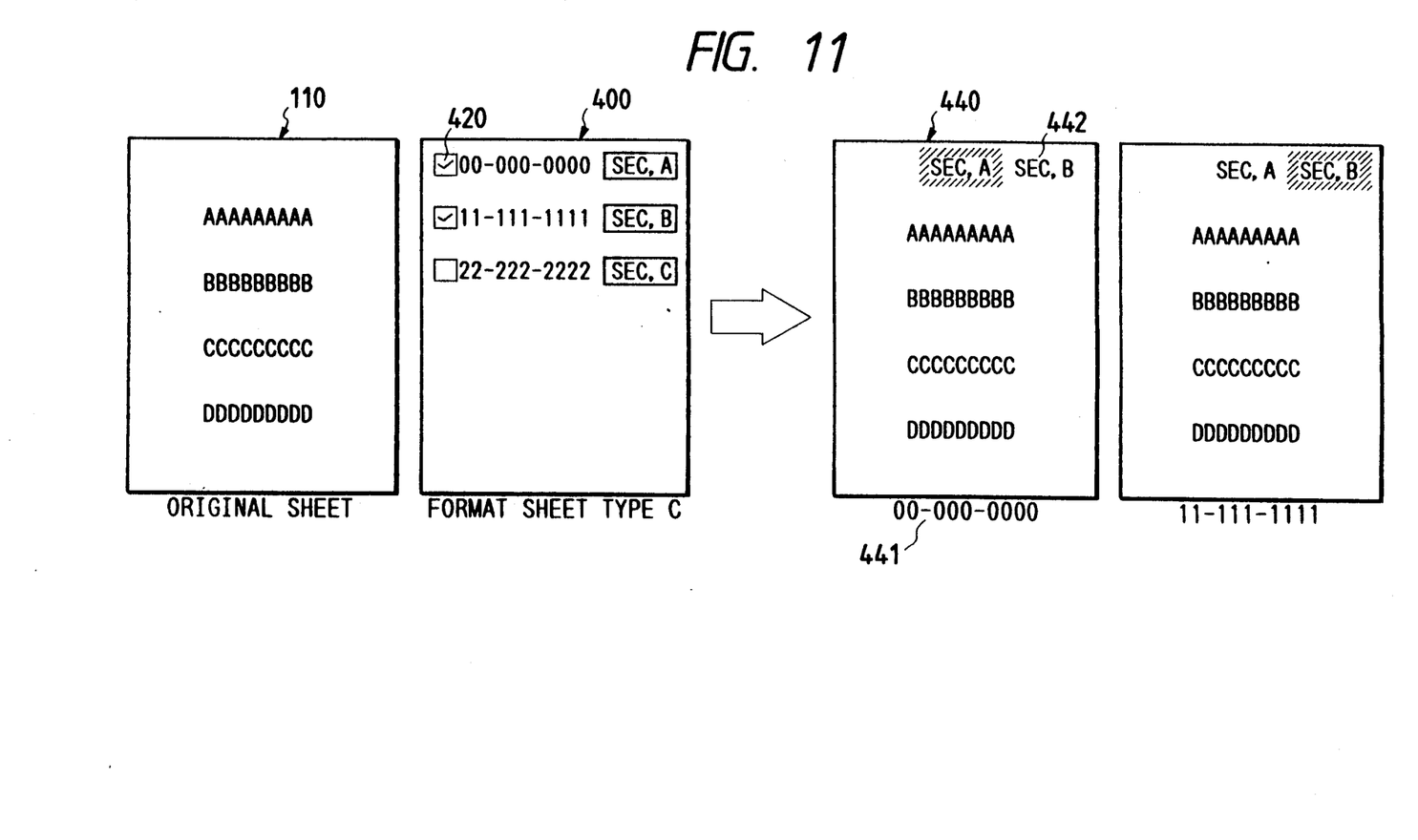
FIG. 11 illustrates an example of output paper with a list of distribution printed on a correspondence document by the use of the job control sheet (C)

FIG. 11 illustrates one example of output paper with a list of the distribution destinations printed on a corresponding document by the use of the job control sheet (C). In this example, instructions are given by means of the machine operation instruction block on the job control sheet, in the same manner as in the case described above.

All of the distribution destinations 441 are printed on output paper 440, with the particular destination of distribution being indicated by marking 443 in a halftone mesh pattern or the like.

Figure 12:
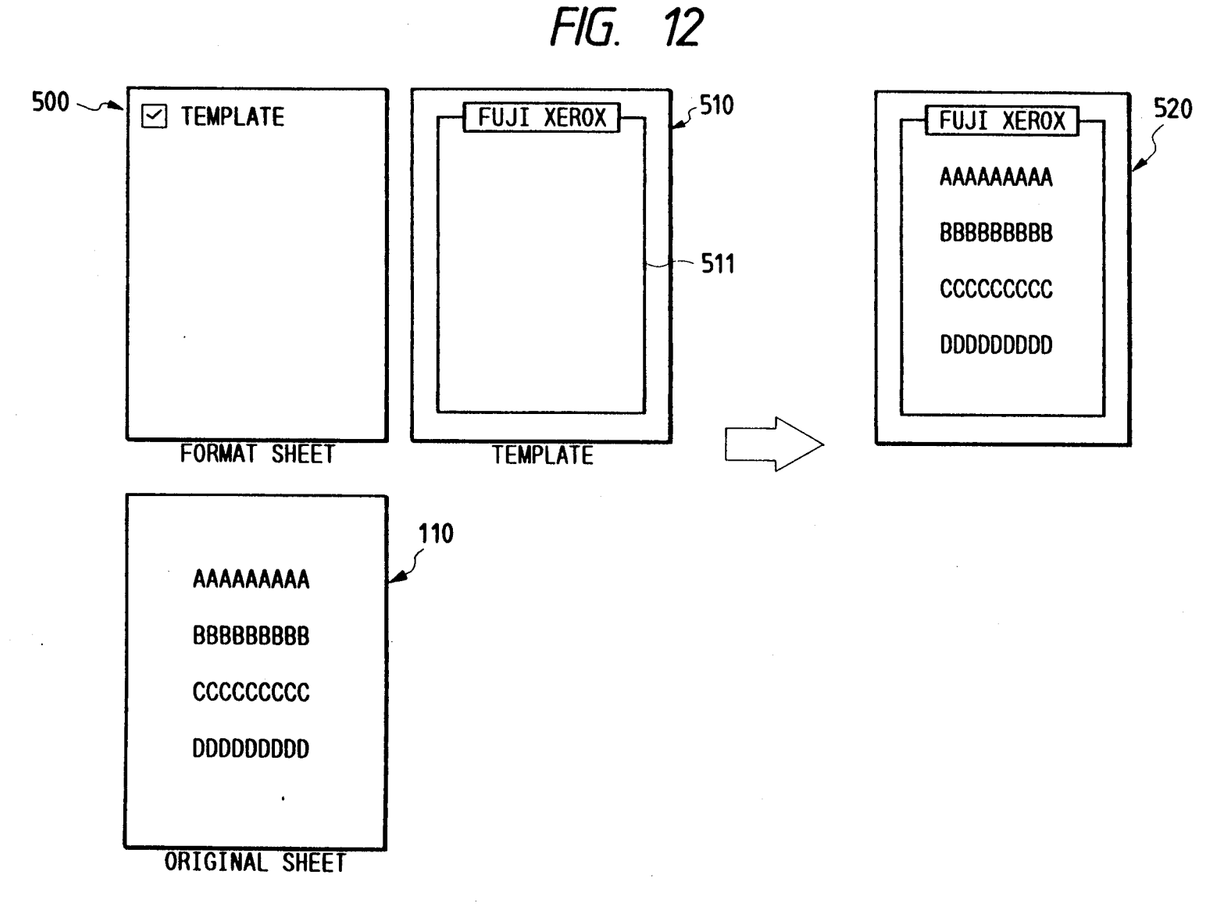
FIG. 12 illustrates an example of output paper produced with the job control sheet (D).

As shown in FIG. 12, job control sheet 500 defines a template 510 as a source of information for instructions for machine operations for the output of the original document within a specified range. This template 510 contains a frame 511, which is a specified area for the input picture information obtained from the original document.

In this example, the input picture images from the original document are enlarged or reduced into the size of the area specified on the template and are accordingly printed on the output paper.

As described hereinabove, the picture image processing system according to the present invention is provided with a machine operation instruction block, by which the system gives the job control sheet instructions on the operations to be performed by the machines, and a process-instruction block, by which the system defines messages and so forth. Therefore, the picture image processing system according to the present invention is capable of producing composite picture images by inserting a message into the picture images obtained from an original document. Also, as the system is capable of defining a message in correspondence to the instructions on machine operations, it is possible for this system to apply different picture image processing operations to the same input picture images and to output the resulting different picture images to a plural number of specified destinations.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A picture image processing system for producing output picture images by executing picture image processing operations on input picture images, said picture image processing system comprising:

input means for providing input picture information from an original document, and for providing instructions on machine operations and processed picture information from a job control sheet including a message in the form of a processed picture, control information for said message, and sheet detecting marks;

recognizing means for recognizing the presence of either said job control sheet or said original document based on said heat detecting marks;

composite picture image generating means for generating composite picture images by further processing said processed picture information for integration thereof into said input picture information according to said control information for said message; and output means for producing an output of said composite picture images.

2. The picture image processing system of claim 1 wherein said composite picture image generating means enables said system to produce a composite picture image by inserting said processed picture information into said input picture information.

3. The picture image processing system of claim 1 wherein said composite picture image generating means produces composite picture images by adding said processed picture information to said input picture information.

4. The picture image processing system of claim 1 wherein said job control sheet includes a machine operation instruction block for defining said instructions on machine operations; and a process-instruction block for defining said processed picture information.

5. The picture image processing system of claim 4 wherein said machine operation instruction block is capable of defining instructions on the operations of different machines for every page of said input picture information, and wherein said process-instruction block defines said processed picture information for said instructions on the operations of different machines.

6. The picture image processing system of claim 4 wherein said machine operation instruction block defines information for instructions on machine operations for a plurality of machines, and wherein said process-instruction block defines said processed picture information for said instructions on machine operations for a plurality of machines.

7. The picture image processing system of claim 6 wherein said job control sheet further comprises an instruction block which permits the user to select a desired portion of said information for instructions whereby said system generates composite picture images by processing said processed picture information for integration with said input picture information on the basis of said selected information.

8. The picture image processing system of claim 1 wherein said input means comprises an input device other than a job control sheet.

9. The picture image processing system of claim 1 wherein said system includes a means for accumulating composite picture images.

10. The picture image processing system of claim 1 wherein said composite picture image generating means is capable of moving composite picture images, or capable of varying the magnification of such picture images, or capable of both moving composite picture images and varying the magnification of such picture images.

11. The picture image processing system of claim 1 wherein said composite picture image generating means produces composite picture images by inserting said processed picture information into said input picture information.

12. The picture image processing system of claim 1 wherein said composite picture image generating means produces composite picture images by the addition of said processed picture information to said input picture information.

13. The picture image processing system of claim 1 wherein said control information for said message includes information for instructing said composite picture image generating means to compose said processed picture information, corresponding to said message, with a specified page of said input picture information.

14. The picture image processing system of claim 1 wherein said control information for said message includes information for instructing said composite picture image generating means to compose said processed picture information, corresponding to said message, with a specified position of a page of said input picture information.

15. A picture image processing system for producing output picture images by executing picture image processing operations on input picture images, said picture image processing system comprising:

input means for providing input picture information from an original document, and for providing instructions on machine operations and processed picture information from a job control sheet including sheet detecting marks, originating points, and picture image coordinates;

recognizing means for recognizing the presence of either said job control sheet or said original document based on said sheet detecting marks so that upon a detection of a job control sheet, said recognizing means locates said picture image coordinates on said job control sheet based on said originating points;

composite picture image generating means for generating composite picture images by further processing said processed picture information for integration thereof into said input picture information; and output means for producing an output of said composite picture images.

* * * * *

UNITED STATES PATENT AND TRADEMARK OFFICE
CERTIFICATE OF CORRECTION

PATENT NO. : 5,126,858

DATED : June 30, 1992

INVENTOR(S) : Toshio Kurogane et al

It is certified that error appears in the above-identified patent and that said Letters Patent is hereby corrected as shown below:

Claim 1, column 8, line 65, change "heat" to --sheet--.

Signed and Sealed this

Nineteenth Day of October, 1993

Attest:

BRUCE LEHMAN

Attesting Officer

Commissioner of Patents and Trademarks